(12) United States Patent
Matsumura et al.

(10) Patent No.: US 12,231,203 B2
(45) Date of Patent: Feb. 18, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Shaozhen Guo, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/906,954

(22) PCT Filed: Mar. 26, 2020

(86) PCT No.: PCT/JP2020/013777
§ 371 (c)(1),
(2) Date: Sep. 21, 2022

(87) PCT Pub. No.: WO2021/192171
PCT Pub. Date: Sep. 30, 2021

(65) Prior Publication Data
US 2023/0142007 A1    May 11, 2023

(51) Int. Cl.
*H04B 7/06* (2006.01)
*H04B 7/08* (2006.01)

(52) U.S. Cl.
CPC ......... *H04B 7/0626* (2013.01); *H04B 7/0691* (2013.01); *H04B 7/0874* (2013.01)

(58) Field of Classification Search
CPC .. H04B 7/0626; H04B 7/0691; H04B 7/0874; H04B 7/06956; H04B 7/0404; Y02D 30/70; H04W 8/24; H04W 88/02
See application file for complete search history.

(56) References Cited

U.S. PATENT DOCUMENTS

| | | | |
|---|---|---|---|
| 2019/0268926 A1 | 8/2019 | Yoshimura et al. | |
| 2020/0029274 A1 | 1/2020 | Cheng et al. | |
| 2021/0281294 A1* | 9/2021 | Takano | H04B 7/10 |
| 2022/0022215 A1* | 1/2022 | Gao | H04B 7/0404 |
| 2022/0095235 A1* | 3/2022 | Zhang | H04W 52/028 |
| 2023/0080333 A1 | 3/2023 | Li | |

FOREIGN PATENT DOCUMENTS

| | | |
|---|---|---|
| CN | 110537334 A | 12/2019 |
| CN | 3072491 A1 * | 12/2020 |
| WO | 2019130938 A1 | 7/2019 |

(Continued)

OTHER PUBLICATIONS

Machine translation of WO-2018074071-A1 (Year: 2023).*
(Continued)

*Primary Examiner* — Jean B Corrielus
(74) *Attorney, Agent, or Firm* — Osha Bergman Watanabe & Burton LLP

(57) ABSTRACT

A terminal according to an aspect of the present disclosure includes a control section that determines activation or deactivation for a panel, and a transmitting section that transmits a report related to determined activation or deactivation for the panel by including the report in at least one of channel state information and MAC control information (MAC CE).

4 Claims, 14 Drawing Sheets

(56) References Cited

FOREIGN PATENT DOCUMENTS

| WO | WO-2019223729 A1 * | 11/2019 | .......... H04B 17/309 |
| WO | 2020015614 A1 | 1/2020 | |

OTHER PUBLICATIONS

Machine translation of WO-2019223729-A1 (Year: 2023).*
Machine Translation of CN-112020143-A. (Year: 2020).*
3GPP TSG RAN WG1 Ad-Hoc Meeting 1901; R1-1901348 "Feature lead summary of Enhancements on Multi-beam Operations" LG Electronics; Taipei, Taiwan; Jan. 21-25, 2019 (31 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
International Search Report issued in International Application No. PCT/JP2020/013777, mailed Nov. 10, 2020 (5 pages).
Written Opinion issued in International Application No. PCT/JP2020/013777; Dated Nov. 10, 2020 (4 pages).
Office Action issued in counterpart Chinese Patent Application No. 202080099130.9 mailed on Jun. 20, 2024 (12 pages).

* cited by examiner

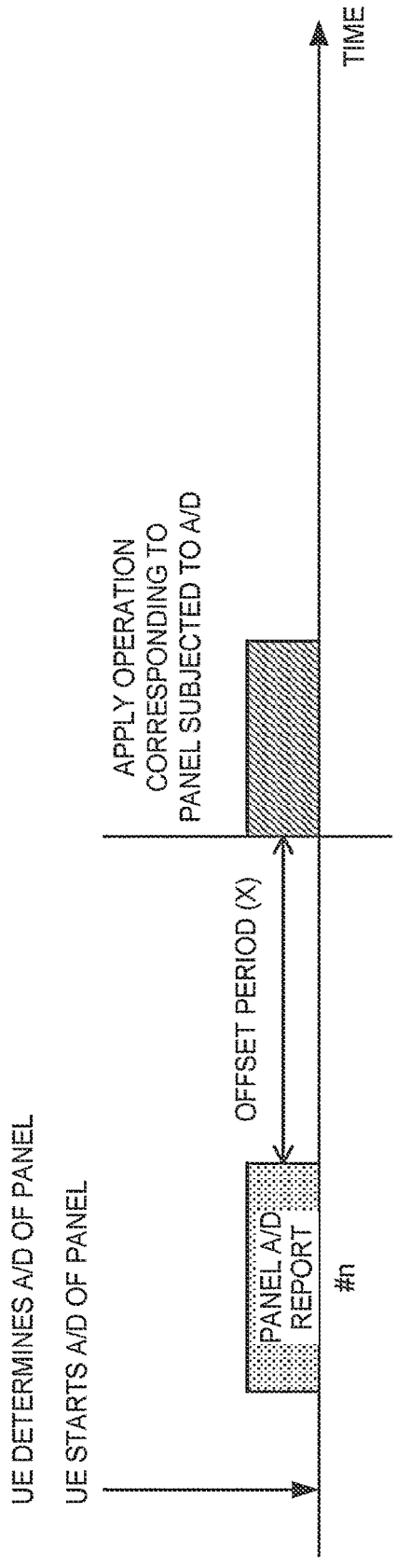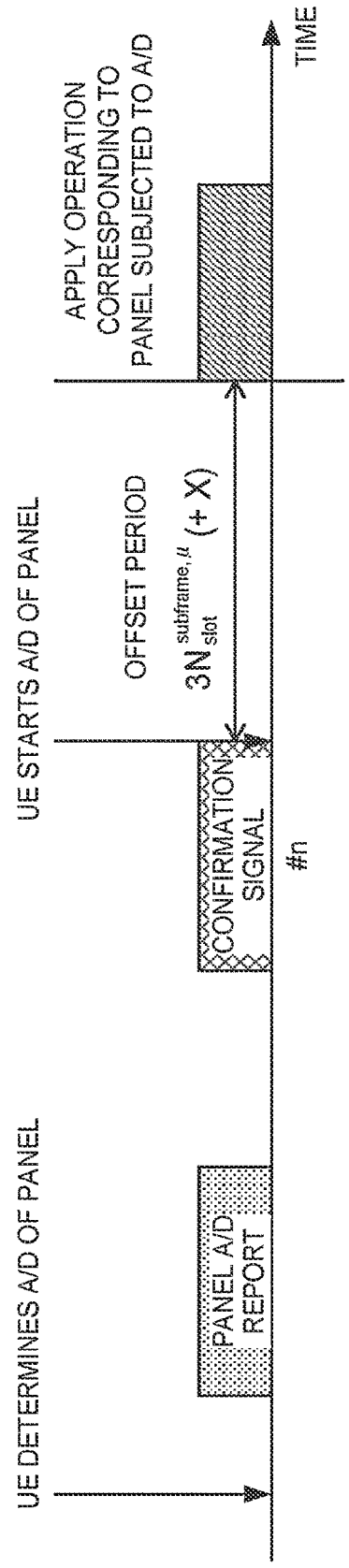

FIG. 3A

| CSI REPORT NUMBER | CSI FIELD | BIT WIDTH |
|---|---|---|
| CSI REPORT #n | A/D OF EACH PANEL (BITMAP) | $N_{panel}$ |

FIG. 3B

| CSI REPORT NUMBER | CSI FIELD | | BIT WIDTH |
|---|---|---|---|
| CSI REPORT #n | A/D OF PANEL | | 1 |
| | PANEL ID | | $Log2(N_{panel})$ |

FIG. 5A

| CSI FIELD | BIT WIDTH |
|---|---|
| PANEL A/D #1 | 1 |
| PANEL A/D #2 | 1 |
| PANEL ID #1 | $\text{Log2}(N_{panel})$ |
| PANEL ID #2 | $\text{Log2}(N_{panel})$ |

FIG. 5B

| CSI FIELD | BIT WIDTH |
|---|---|
| PANEL A/D | 1 |
| PANEL ID #1 | $\text{Log2}(N_{panel})$ |
| PANEL ID #2 | $\text{Log2}(N_{panel})$ |

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

In existing LTE systems (for example, 3GPP Rel. 8 to Rel. 14), a user terminal (User Equipment (UE)) transmits uplink control information (UCI) by using at least one of a UL data channel (for example, a Physical Uplink Shared Channel (PUSCH) and a UL control channel (for example, a Physical Uplink Control Channel (PUCCH)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), a scheme has been under study, in which the UE determines a DL receive beam (spatial domain reception filter) and a UL transmit beam (spatial domain transmission filter), based on information notified from a base station. A scheme has teen under study, in which the UE performs DL reception and UL transmission by switching a plurality of UE panels (panels, antenna panels).

However, how the UE controls switching (for example, activation/deactivation) of the panels has not been clarified. Unless activation/deactivation of the panels is appropriately controlled, system performance may deteriorate, for example, power consumption may increase and a beam gain may reduce.

In view of this, the present disclosure has an object to provide a terminal, a radio communication method, and a base station that enable appropriate control of switching of panels.

Solution to Problem

A terminal according to an aspect of the present disclosure includes a control section that determines activation or deactivation for a panel, and a transmitting section that transmits a report related to determined activation or deactivation for the panel by including the report in at least one of channel state information and MAC control information (MAC CE).

Advantageous Effects of invention

According to an aspect of the present disclosure, switching of panels can be appropriately controlled.

BRIEF DESCRIPTION OF DRAWINGS

FIG. 2A and FIG. 2B are each a diagram to show an example of report operation of A/D of a panel determined by the UE;

FIG. 3A and FIG. 3B are each a diagram to show an example of report contents of A/D of a panel in a CSI report;

FIG. 5A and FIG. 5B are each a diagram to show another example of report contents of A/D of panels in the CSI report;

DESCRIPTION OF EMBODIMENTS

Figure 1:
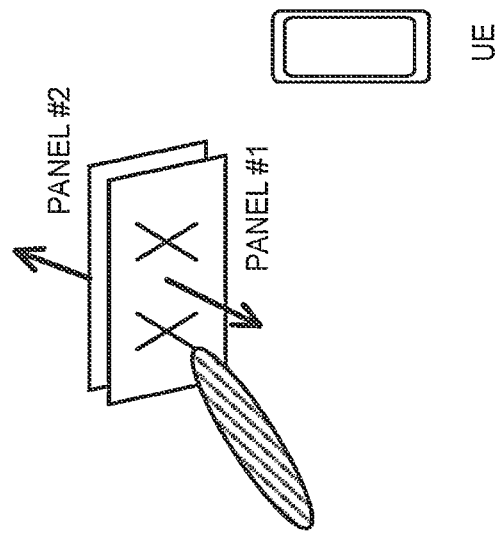
FIG. 1 is a diagram to show panel use of a UE in 3GPP Rel. 15.

FIG. 1 is a diagram to show panel use of a UE in 3GPP Rel. 15. In Rel. 15, selection/purpose of an uplink (UL) panel of a user terminal (User Equipment (UE)) is transparent to a network (NW, for example, a base station, a gNB). The UE uses only one panel for UL transmission at a time, and does not simultaneously use a plurality of panels. In the example shown in FIG. 1, the UE uses Panel #1 for UL transmission. The UE can also dynamically switch and use a panel to be used with an implicit method (notification).

However, in Rel. 15, the UE has the plurality of panels constantly turned on in order to support beam management. Because the USE has the panels constantly turned on, when a communication speed of a panel being used reduces due to an obstruction or the like, the UE can promptly switch to another panel, which leads to enhancement of performance.

However, with the plurality of panels being constantly turned on, there is a problem of high power consumption, thus being inefficient.

In order to optimize power consumption of the UE, it is effective to deactivate panels that are not used by the UE. In Rel. 16, activation/deactivation of UE panels depends on UE implementation, and is not recognized by the base station (for example, the gNB) (not visible from (transparent to) the base station). There exists no mechanism that supports efficient activation/deactivation of UE panels and aligns pieces of information of activation/deactivation of the UE panels between the base station and the UE.

Unless activation/deactivation of the UE panels is appropriately performed, system performance may deteriorate, for example, power consumption may increase and a beam gain may reduce.

In view of this, the inventors of the present invention studied a control method of activation/deactivation of UE panels, and came up with the idea of the present embodiment.

Embodiments according to the present disclosure will be described in detail below with reference to the drawings. The radio communication methods according to respective embodiments and aspects may each be employed individually, or may be employed in combination. Note that, in the present disclosure, "A/B" may be interpreted as "at least one of A and B". Note that "notify" in the present disclosure may be interchangeably interpreted as "indicate", "configure", and "transmit".

In the following, a "panel" of the UE in the present disclosure may be interchangeably interpreted as a "Reference Signal (RS) port group", a "Demodulation Reference Signal (DMRS) port group", a "Sounding Reference Signal (SRS) port group", an "RS resource group", a "DMRS resource group", an "SRS resource group", a "beam group", a "Transmission Configuration Indication (TCI) state group", a "spatial relation group", an "SRS resource indicator (SRI) group", or an "antenna port group".

"Activate" in the present disclosure may mean to turn on a panel or to bring a panel to an active state. The active state may mean at least one of a state in which blind detection of a downlink control channel (Physical Downlink Control Channel (PDCCH)) can be performed in a configured search space, a state in which a downlink shared channel (Physical Downlink Shared Channel (PDSCH)) scheduled by downlink control information (DCI) or the like can be received from the NW, and a state in which a UL data channel (for example, a Physical Uplink Shared Channel (PUSCH)) scheduled by DCI or the like can be transmitted from the NW.

"Deactivate" in the present disclosure may mean to turn off a panel or to bring a panel to a deactivated state. The deactivated state may mean at least one of a state in which bind detection of a PDCCH is not requested in a configured search space, a state in which reception of a PDSCH scheduled by DCI or the like from the NW is not requested, and a state in which transmission of a PUSCH scheduled by DCI or the like from the NW is not requested.

"Activate" in the present disclosure may be interpreted as activation, make active, updating, or update. "Deactivate" in the present disclosure may be interpreted as deactivation, make deactivation, make inactive, or stop.

Radio Communication Method

Activation/deactivation of UE panels may be controlled (or determined, judged) by the UE, and reported (or notified) to the base station (report operation A). Activation/deactivation of UE panels may be reported by the UE, and confirmed (approved) by the base station (report operation B).

Report Operation A

FIG. 2A shows an example of a case in which the UE controls activation/deactivation (hereinafter also referred to as A/D) of a panel of its own terminal, and notifies the base station of information that the UE performs activation/deactivation of the panel.

For example, the UE determines activation/deactivation of a panel of its own terminal, and performs activation/deactivation of the determined panel. The UE reports information related to the panel to be activated/deactivated to the base station. The UE performs operation corresponding to the panel to be activated/deactivated after an elapse of a certain period since the UE reports the information related to activation/deactivation of the panel to the base station.

The certain period may be referred to as an offset period. The offset period may be defined with a certain value. The certain value may be changed according to a subcarrier spacing configured for a channel (for example, a PUCCH/PUSCH) used of a report (hereinafter also referred to as A/D report) of the information related to activation/deactivation.

The certain value may be expressed by at least one of a first value (for example, X) and a second value (for example, $N_{slot}^{subframe,\mu}$) indicating the number of slots. FIG. 2A shows a case in which the offset period is X. X may be defined in a specification in advance. Alternatively, X may be determined according to UE capability, for example. In this case, UE capability information (for example, X corresponding to the UE capability) may be reported from the UE to the base station. Alternatively, X may be notified from the base station to the UE using at least one of higher layer signaling and DCI. For example, the base station may notify the UE of X, based on the UE capability information reported from the UE.

For example, when the UE reports the information related to activation/deactivation in slot #n, the UE performs operation corresponding to the panel to be activated/deactivated from the first slot after slot #n+X. A slot may be interpreted as a subframe, a subslot, or a symbol. The operation corresponding to the panel to be activated may be interpreted as operation using the panel to be activated. The operation corresponding to the panel to be deactivated may be interpreted as operation not using the panel to be deactivated.

When activation of the panel is reported, the USE may control to perform operation (or communication operation) using the panel to be activated after an elapse of the offset period (for example, X). When deactivation of the panel is reported, the UE may control to not perform (or to stop) operation using the panel to be deactivated after an elapse of the offset period.

The operation (or communication operation) using the panel refers to transmission processing/reception processing or the like using the panel, for example, and may mean at least one of blind detection operation of a PDCCH in a configured search space, reception operation of a PDSCH scheduled by DCI or the like from the NW, transmission operation of a PUSCH scheduled by DCI or the like from the NW, and transmission operation of a PUCCH.

Report Operation B

FIG. 2B shows an example of a case in which the UE reports (or requests) information of requesting activation/ deactivation of a panel of its own terminal to the base station, and performs activation/deactivation of the panel after it is confirmed (or approved) by the base station. The UE reports the panel to be activated/deactivated to the base station, but may be unable to activate/deactivate the panel until the UE receives confirmation/approval from the base station.

For example, the UE determines activation/deactivation of a panel of its own terminal (for example, a panel to be activated/deactivated), and reports (or requests) determined activation/deactivation of the panel to the base station. Depending on the report (or request) from the UE, the base station may transmit information (hereinafter also referred to as approval information) for giving a notification of approval (or trigger/request) of the activation/deactivation of the panel to the UE.

The UE performs operation corresponding to the panel to be activated/deactivated after an elapse of a certain period since the UE receives the approval information transmitted from the base station. The certain period may be referred to as an offset period. FIG. 2B shows a case in which the offset period is $3N_{slot}^{subframe,\mu}(+X)$. Note that the offset period is not limited to $3N_{slot}^{subframe,\mu}$, and another value may be configured.

For example, when the UE reports the information related to activation/deactivation in slot #n, the UE performs operation corresponding to the panel to be activated/deactivated from the first slot after slot $n+3N_{slot}^{subframe,\mu}+(X)$. A slot may be interpreted as a subframe, a subslot, or a symbol. The operation corresponding to the panel to be activated may be interpreted as operation using the activated panel. The operation corresponding to the panel to be deactivated may be interpreted as operation not using the deactivated panel.

When activation of the panel is approved, the UE may control to perform operation (or communication operation) using the panel of which the activation is approved after an elapse of the offset period (for example, X). When deactivation of the panel is approved, the UE may control to not perform (or to stop) operation using the panel of which the deactivation is approved after an elapse of the offset period.

First Aspect

A first aspect will describe an example in which the UE performs the report operation of the information related to activation/deactivation of the panel of its own terminal.

The information related to activation/deactivation of the panel may be information that the UE performs activation/deactivation of the panel (report operation A above), or may be information (for example, report operation B above) that the UE requests activation/deactivation of the panel.

The information that the UE performs activation/deactivation of the panel may be at least one of information of the panel to be activated and information of the panel to be deactivated. The information that the UE requests activation/deactivation of the panel may be at least one of information of the panel of which activation is requested and information of the panel of which deactivation is requested.

UE Report Contents

The UE may report (A/D report) the information related to activation/deactivation of each panel. For example, the UE may perform A/D report for one or more panels configured for its own terminal. When a plurality of panels are configured for the UE, the UE performs A/D report of each panel.

In this case, a certain bit (for example, 1 bit) is configured for each panel, and the UE may give a notification of activation/deactivation of each panel in a bitmap format.

Alternatively, the UE may perform A/D report of a specific panel. For example, the UE may perform A/D report for a specific panel among the panels configured for its own terminal. The specific panel may be a panel that performs switch (or change, updating, update) of activation/deactivation.

In this case, the UE may give a notification of information related to identification information (for example, a panel ID) of a specific panel and the information (for example, 1 bit) related to activation/deactivation or the specific panel.

UE Report Signaling and Format

The A/D report of the panel reported from the UE may be triggered by the base station, or may be triggered by the UE.

Triggering by Base Station

The UE may control (for example, trigger) the A/D report of the panel, based on an indication (or request, trigger) from the base station. For the report operation of activation/deactivation of the panel, a method (or mechanism) similar to that for configuration/activation/trigger of a channel state information (CSI) report may be used.

For example, the UE may notify the base station of the A/D report by including the A/D report in a CSI report. In this case, the A/D report may be performed using an uplink channel (for example, a PUCCH/PUSCH). The CSI report may be at least one of a periodic CSI (P-CSI) report, a semi-persistent CSI (SP-CSI) report, and an aperiodic CSI (A-CSI) report.

FIG. 3A is a diagram to show an example of report contents of a case in which the UE reports information related to activation/deactivation of each panel as a CSI report. A case is herein shown in which the UE reports information of a bitmap indicating activation/deactivation of each panel by including the information in a certain CSI report (for example, CSI report #n).

The size (for example, bit width) of bitmap information may be determined based on the number of panels (for example, $N_{panel}$. A case is herein shown in which the bit width corresponding to the number of panels is configured.

FIG. 3B is a diagram to show an example of report contents of a case in which the UE reports information related to activation/deactivation of a specific panel as a CSI report. A case is herein shown in which the UE reports information indicating a specific panel ID (Panel ID) and information indicating activation/deactivation of the specific panel ID by including the pieces of information in a certain CSI report (for example, CSI report #n).

In this specification, the panel ID may be an RS group ID, an RS set ID, an antenna port ID, an antenna port group ID, an antenna port set ID, a group-based beam report group index, or a new ID.

The size (for example, bit width) of the information indicating the panel ID may be determined based on the number of panels (for example, $N_{panel}$). A case is herein shown in which the size of the information indicating the panel ID is defined by $Log2(N_{panel})$, and the size of the information indicating activation/deactivation of a specific panel ID is defined by 1 bit. As a matter of course, the contents and the size of the CSI report are not limited to this.

Note that CSI report in shown in FIGS. 3A and 3D may be added as a part of an existing CST report. The existing CSI report may be, for example, an L1-RSRP report or an SINR beam report.

Alternatively, CSI report in may be configured or defined as a new type of CSI report. When priority is configured for the CSI report, the priority of the CSI report (for example, CSI report #n) including the information related to activation/deactivation of the panel may be configured to be higher than other CSI reports. Alternatively, the priority of CSI report #n may be configured to be the second highest, following a certain CSI report. The certain CSI report may be a CSI report corresponding to at least one of the L1-RSRP report and the SINR beam report.

Triggering by UE

The UE may control (for example, trigger) the A/D report of the panel, based on a certain condition (for example, a certain event). In other words, the UE may trigger the A/D report of the panel, regardless of an explicit indication (or request, trigger) from the base station. In this case, the UE may perform report using MAC control information (MAC CE).

The certain condition may be expiry of a certain timer. Alternatively, the certain condition may be at least one of a criterion (UE implementation) autonomously determined by the UE, received power of the panel, and received quality of the panel.

When the certain timer expires, the UE may trigger the A/D report of the panel. The certain timer may be a timer (for example, PeriodicReport-Timer) configured for periodic report, or may be a timer for another purpose. The certain timer may be defined in a specification, or may be notified from the base station to the UE using higher layer signaling or the like. When the UE triggers the report based on expiry of the certain timer, the UE may restart the certain timer.

When the UE determines activation/deactivation of the panel, the UE may trigger the A/D report of the panel.

For example, a case is assumed in which activation/deactivation of the panel is determined based on UE implementation. In this case, the UE may determine activation/deactivation of the panel, based on UE implementation, and trigger the A/D report of the panel.

Alternatively, a case is assumed in which activation/deactivation of the panel is determined based on a certain criterion. In this case, when there is a panel that satisfies the certain criterion, or when a certain panel satisfies the certain criterion, the UE may trigger the A/D report of the panel. The certain criterion may be, for example, whether or not a value of received power (for example, RSRP) of a reference signal or a beam received using the panel is equal to or lower than a certain value. Note that the certain criterion is not limited to this, and a configuration shown in the second aspect may be used as appropriate, for example.

Figure 4A:
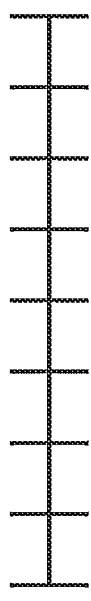
FIG. 4A and FIG. 4B are each a diagram no show an example of report contents of A/D of a panel in a MAC CE.

FIG. 4A is a diagram to show an example of report contents of a case in which the UE reports information related to activation/deactivation of each panel using the MAC CE. FIG. 4A shows a case in which bits (or a bit field, a field) indicating activation/deactivation of each panel are configured to the MAC CE.

Ai may be a field used for a notification of activation/deactivation of panel ID #i. For example, Ai=1 may correspond to activation of panel ID #i, and Ai=0 may correspond to deactivation of panel ID #i. Alternatively, Ai=1 may correspond to deactivation of panel ID #i, and Ai=0 may correspond to activation of panel ID #i.

Figure 4B:
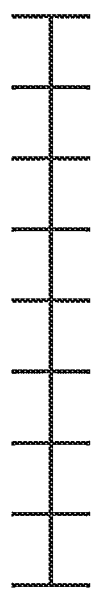

FIG. 4B is a diagram to show an example of report contents of a case in which the UE reports information related to activation/deactivation of a specific panel using the MAC CE. FIG. 4B shows a case in which bits (or a bit field) specifying a specific panel ID and bits used for a notification of activation/deactivation of the specific panel ID are configured to the MAC CE.

In FIG. 4B, the bit field specifying the specific panel ID corresponds to "Panel ID", and the bit field used for a notification of activation/deactivation of the specific panel ID corresponds to "A/D". The size of the bit-field specifying the specific panel ID may be determined based on the number of panels configured for the UE or a maximum number of panels that can be configured.

FIGS. 4A and 4B show cases in which the bit field for a serving cell ID and the bit field for a BWP ID are included in the MAC CE. However, the configuration of the MAC CE is not limited to this. For example, at least one of the bit field for a serving cell ID and the bit field for a BWP ID may not be included in the MAC CE.

Variations

FIG. 3B and FIG. 4B show cases in which, as a specific panel, one panel ID and activation/deactivation of the panel ID are reported. However, this is not restrictive. For example, as a specific panel, activation/deactivation of a plurality of panel IDs may be reported. The number of panels reported by the UE may be defined in a specification, or may be configured from the base station to the UE using higher layer signaling or the like.

In this case, pieces of information related to activation/deactivation corresponding to respective panels may be reported, or a common piece of information related to activation/deactivation or respective panels may be reported.

FIG. 5A is a diagram to show an example of report contents of a case in which the UE reports information related to activation/deactivation of specific panels (here, panel ID #1 and panel ID #2) as a CSI report. A case is herein shown in which the UE reports pieces of information indicating a plurality of respective specific panel IDs and pieces of information indicating activation/deactivation of the plurality of respective specific panel IDs.

FIG. 5B is a diagram to show another example of report contents of a case in which the U reports information related to activation/deactivation of specific panels (here, panel ID #1 and panel ID #2) as a CSI report. A case is herein shown in which the UE reports pieces of information indicating a plurality of respective specific panel IDs and a common piece of information indicating activation/deactivation of the plurality of specific panel IDs.

Figure 6A:
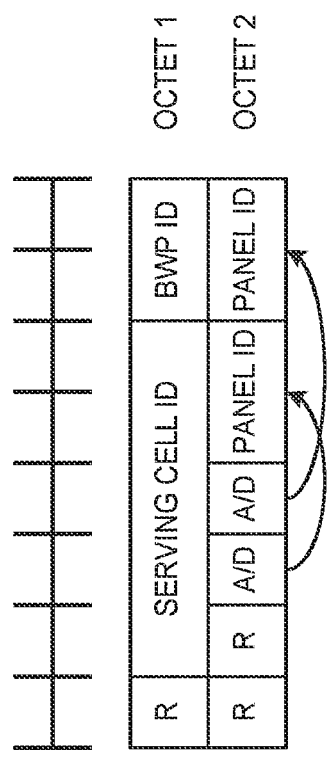
FIG. 6A and FIG. 6B are each a diagram to show another example of report contents of A/D of panels in the MAC CE.

FIG. 6A is a diagram to show an example of report contents of a case in which the UE reports information related to activation/deactivation of specific panels (here, panel ID #1 and panel ID #2) using the MAC CE. A case is herein shown in which, in the MAC CE, bits (or a bit field) specifying a plurality of specific panel IDs are separately configured, and bits respectively used for a notification of activation/deactivation of the plurality of specific panel IDs are separately configured.

Figure 6B:
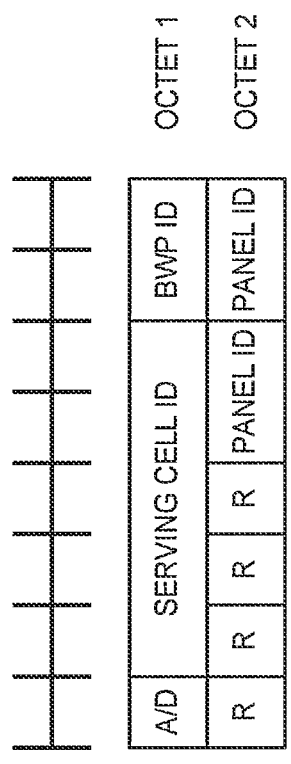

FIG. 6B is a diagram to show another example of report contents of a case in which the UE reports information related to activation/deactivation of specific panels (here, panel ID #1 and panel ID #2) by using the MAC CE. A case is herein shown in which, in the MAC CE, bits (or a bit field) specifying a plurality of specific panel IDs are separately configured, and bits used for a notification of activation/deactivation of the plurality of specific panel IDs are configured to be common.

In this manner, by performing report using separate fields (for example, A/D fields) for each of a plurality of panel IDs, A/D can be flexibly configured for each panel ID. Moreover, by performing report using a common field (for example, an A/D field) for a plurality of panel IDs, increase of overhead can be suppressed even when the number of panel IDs to be reported is increased.

Activation/deactivation of the panel may be controlled (for example, reported) for each BWP group and for each CC group. For example, activation/deactivation of the panel may be applied to one or more BWP groups. Activation/deactivation of the panel may be applied to one or more CC groups.

Information related to the BWP group/CC group may be defined in a list and notified from the base station to the UE. For example, a list in which one or more CCs are defined and a list in which one or more BWPs are defined may be configured for the UE, using higher layer signaling. A plurality of lists (for example, X lists) may be configured for the UE.

Activation/deactivation of the panel may be applied to one or more CCs or one or more BWPs included in the same list.

Figure 7A:
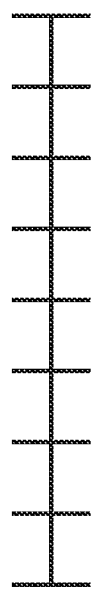
FIG. 7A and FIG. 7B are each a diagram to show another example of report contents of A/D of a panel in a MAC CE.
Figure 7B:
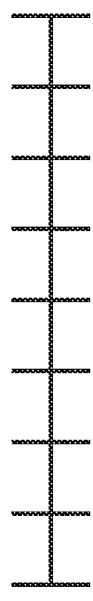

Information related to the list of BWPs/CCs may be notified from the UE to the base station, using the MAC CE. For example, in FIGS. 4A and 4B, the bit field for a cell ID may be replaced by a bit field used for specification of a CC list ID, or the bit field for a BWP may be used as a bit field used for specification of a BWP list ID (see FIGS. 7A and 7B). With this, A/D of the panel can be flexibly switched for each certain BWP group/for each CC group.

Second Aspect

A second aspect will describe an example of a criterion (or condition/parameter) of a case in which the UE performs report of information related to activation/deactivation of the panel of its own terminal. At least one of the criteria described below may be applied in the first aspect.

Deactivation Criteria

A criterion for deactivation may be at least one of the following deactivation criterion 1 and criterion 2.

Deactivation Criterion 1

Deactivation of the panel is based on CSI-RS measurement results. The UE may determine/judge deactivation of the panel, based on measurement results of a CSI-RS.

For example, when the UE determines deactivation of the panel, the UE may perform deactivation of the panel, and also trigger report of deactivation of the panel (report operation A). Alternatively, when the UE determines deactivation of the panel, the UE may trigger report for requesting deactivation of the panel (report operation B).

Deactivation criterion 1 may follow any one of the following deactivation criteria 1-1 and 1-2. Note that, in the following description, a CSI-RS may be interpreted as another signal (for example, a synchronization signal block (SSB)). A beam may be interpreted as a CSI-RS or an SSB.

Deactivation Criterion 1-1

When a measurement result (for example, RSRP/SINR) of the best beam in a certain panel is smaller than a threshold in certain time duration, the panel may be deactivated. The time duration may be interpreted as duration.

Deactivation Criterion 1-2

When an average measurement result (RSRP/SINR) of X (for example, X best) beams in a certain panel is smaller than a threshold in certain time duration, the panel may be deactivated.

At least one of the time duration, the threshold, and X may be defined in a specification, may be notified from the base station to the UE by using higher layer signaling or the like, or may be autonomously determined by the UE (UE implementation). The measurement may be performed using another signal (for example, a synchronization signal block) instead of the CSI-RS.

The UE may measure the same CSI-RS resource using a plurality of panels at the same time or different times, and identify whether or not a measurement result is lower than the threshold.

Deactivation criterion 1 may be applied in a reference signal set (RS set) configured for L1-RSRP/SINR measurement. Alternatively, deactivation criterion 1 may be applied in a reference signal set (RS set) configured for beam report.

Alternatively, in deactivation criterion 1, when the UE recognizes/confirms maximum permissible exposure (MPE), the UE may deactivate the panel corresponding to spatial relation detected as MPE.

Deactivation Criterion 2

Deactivation of the panel is based on performance of a PDCCH/PDSCH. The UE may determine/judge deactivation of the panel, based on performance of a PDCCH/PDSCH. Deactivation criterion 2 may follow any one of the following deactivation criteria 2-1 and 2-2.

Deactivation Criterion 2-1

When performance of a PDCCH/PDSCH/PUCCH/PUSCH in a certain panel is smaller than a threshold in certain time duration, the panel may be deactivated. For example, the performance may be a block error rate (BLER). The BLER may be a hypothetical BLER (Hypothesis BLER) used in beam failure detection. Note that the hypothetical BLER may be interpreted as an SINR.

Deactivation Criterion 2-2

When performance of a PDCCH/PDSCH in one or more activated panels except a certain panel satisfies a requirement in certain time duration, the panel may be deactivated. When performance of a PDCCH/PDSCH in a plurality of panels satisfies the requirement, the panel to be deactivated may be selected in accordance with at least one of the following selection methods 1 to 4.

Selection Method 1

A panel to be deactivated is selected at random.

Selection Method 2

A panel having the lowest RSRP/SINR of the best beam in the panel is selected. The RSRP/SINR may be determined based on measurement results of the SSB/CSI-RS.

Selection Method 3

A panel having the lowest average RSRP/SINR of X best beams in the panel is selected.

Selection Method 4

A panel having the worst performance of the PDCCH/PDSCH is selected.

The UE may perform transmission or reception of the PDCCH/PDSCH by using a plurality of panels at the same time or different times, and identify whether or not the performance of the PDCCH/PDSCH is lower than a threshold, or identify whether or not the performance satisfies a requirement.

Figure 8:
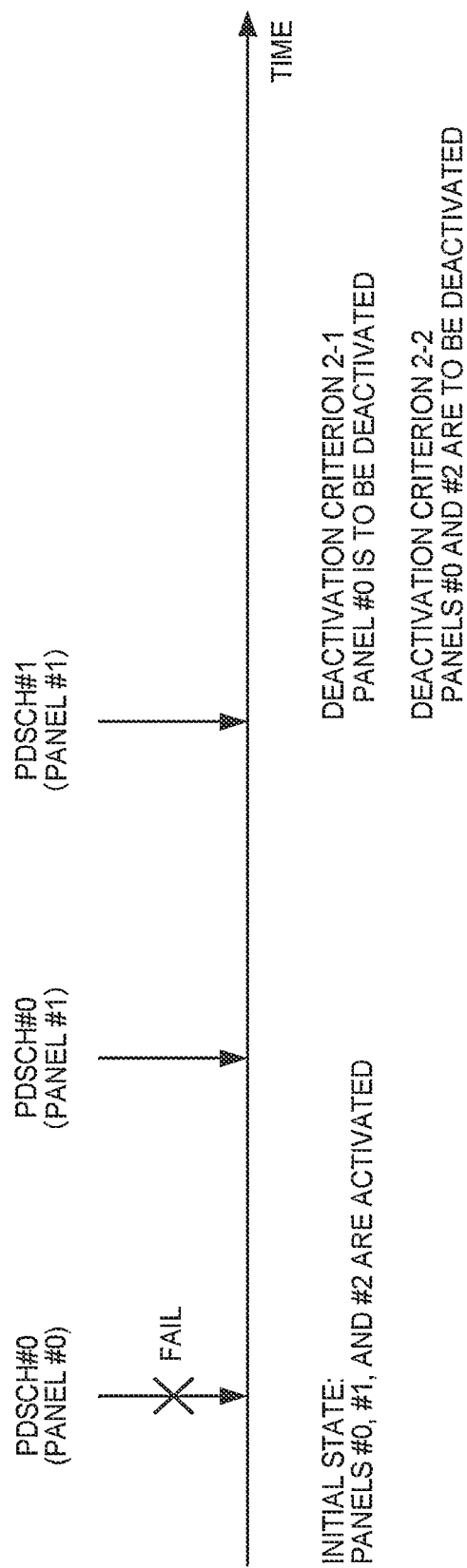
FIG. 8 is a diagram to show an example of a determination method of a panel to be deactivated.

In the example of FIG. 8, panels #0, #1, and #2 are activated. The UE fails in receiving PDSCH #0 using panel #0, succeeds in receiving PDSCH #0 using panel #1, and succeeds in receiving PDSCH #1 using panel #1.

The UE may use deactivation criterion 2-1, and when the performance of the PDSCH of panel #0 is smaller than the threshold, the UE may determine to deactivate panel #0.

The UE may use deactivation criterion 2-2, and when the performance of the PDSCH of panel #0 does not satisfy the requirement and the performance of the PDSCH of panel #1 satisfies the requirement, the requirement of the PDSCH is ensured using panel #1, and thus the UE may determine to deactivate other panels #0 and #2.

Activation Criteria 1

A criterion for activation may be at least one of the following activation criterion 1 and criterion 2.

Activation Criterion 1

Activation of the panel is based on CSI-RS measurement results. The UE may determine/judge deactivation of the panel, based on measurement results of a CSI-RS.

For example, when the UE determines activation of the panel, the UE may perform activation of the panel, and also trigger report of activation of the panel (report operation A). Alternatively, when the UE determines activation of the panel, the UE may trigger report for requesting activation of the panel (report operation B).

Activation criterion 1 may follow any one of activation criteria 1-1 and 1-2 under the following supposition 1-1.

Supposition 1-1

The UE does not measure the CSI-RS using the deactivated panel. The UE determines whether or not activation of a new panel is necessary, based on measurement results of the currently activated panel. When measurement results/performance of the currently activated panel is low, the UE activates a new panel.

Activation Criterion 1-1

If, regarding one, N, or all of the activated panels, a measurement result (RSRP/SINR) of the best beam in the panels is smaller than a threshold in certain time duration, the UE may activate a new panel, based on a certain rule.

Activation Criterion 1-2

If, regarding one, N, or all of the activated panels, an average measurement result (RSRP/SINR) of X best beams in the panels is smaller than a threshold in certain time duration, the UE may activate a new panel, based on a certain rule.

The certain rule may be at least one of the following.
A panel having the highest RSRP/SINR of the best beam is selected
A panel having the highest average RSRP/SINR of X best beams is selected
Selection is made based on UE implementation
Activation criterion 1 may follow any one of activation criteria 1-3 to 1-8 under the following supposition 1-2.

Supposition 1-2

The UE measures the CSI-RE using the deactivated panel. When measurement results of the panel are satisfactory (activation criteria 1-3 and 1-4), or when measurement results of the panel are more satisfactory than measurement results of the currently activated panel (activation criteria 1-5 and 1-6), or when measurement results of the currently activated panel are low (activation criteria 1-7 and 1-8), the UE determines to activate the panel.

Activation Criterion 1-3

When a measurement result (RSRP/SINR) of the best beam in the panel is larger than a threshold in certain time duration, the panel may be activated.

Activation Criterion 1-4

When an average measurement result (RSRP/SINR) of X best beams in the panel is larger than a threshold in certain time duration, the panel may be activated.

Activation Criterion 1-5

When measurement results (RSRP/SINR) of the best beam in the panel are larger than those of one, N, or all of the activated panels in certain time duration, the panel may be activated.

Activation Criterion 1-6

When average measurement results (RSRP/SINR) of X best beams in the panel are larger than those of one, N, or all of the activated panels in certain time duration, the panel may be activated.

Activation Criterion 1-7

If, regarding one, N, or all of the activated panels, a measurement result (RSRP/SINR) of the best beam in the panels is lower than a threshold in certain time duration, a certain panel may be activated. When a measurement result of the best beam of the deactivated panel is larger than a threshold, the panel having the highest measurement result among the deactivated panels may be activated.

Activation Criterion 1-8

If, regarding one, N, or all of the activated panels, an average measurement result (RSRP/SINR) of N best beams in the panels is lower than a threshold in certain time duration, a certain panel may be activated. When an average measurement result of N best beams in the deactivated panels are larger than a threshold, the panel having the highest average measurement result among the deactivated panels may be activated.

At least one of the time duration, the threshold, X, and N may be defined in a specification, may be notified from the base station to the UE by using higher layer signaling or the like, or may be autonomously determined by the UE (UE implementation). The measurement may be performed using another signal (for example, a synchronization signal block) instead of the CSI-RS.

Activation Criterion 2

Activation of the panel is based on performance of a PDCCH/PDSCH/PUCCH/PUSCH.

Regarding activation criterion 2, activation criterion 2 may follow any one of activation criteria 2-1 and 2-2 under the following supposition 2-1.

Supposition 2-1

The UE does not receive the PDCCH/PDSCH using the deactivated panel. The UE determines whether or not activation of a new panel is necessary, based on performance using the currently activated panel.

Activation Criterion 2-1

If, regarding one, N, or all of the activated panels, performance or the PDCCH/PDSCH or the panels is smaller than a threshold (for example, an error rate (BLER) is larger than a threshold) in certain time duration, a new panel autonomously selected by the UE may be activated.

Activation Criterion 2-2

When performance of the PDCCH/PDSCH in the currently activated panel does not satisfy a requirement in certain time duration, a new panel autonomously selected by the UE may be activated.

Note that, even when performance in a certain activated panel does not satisfy a requirement, a new panel need not be activated when performance is ensured using another activated panel.

Figure 9:
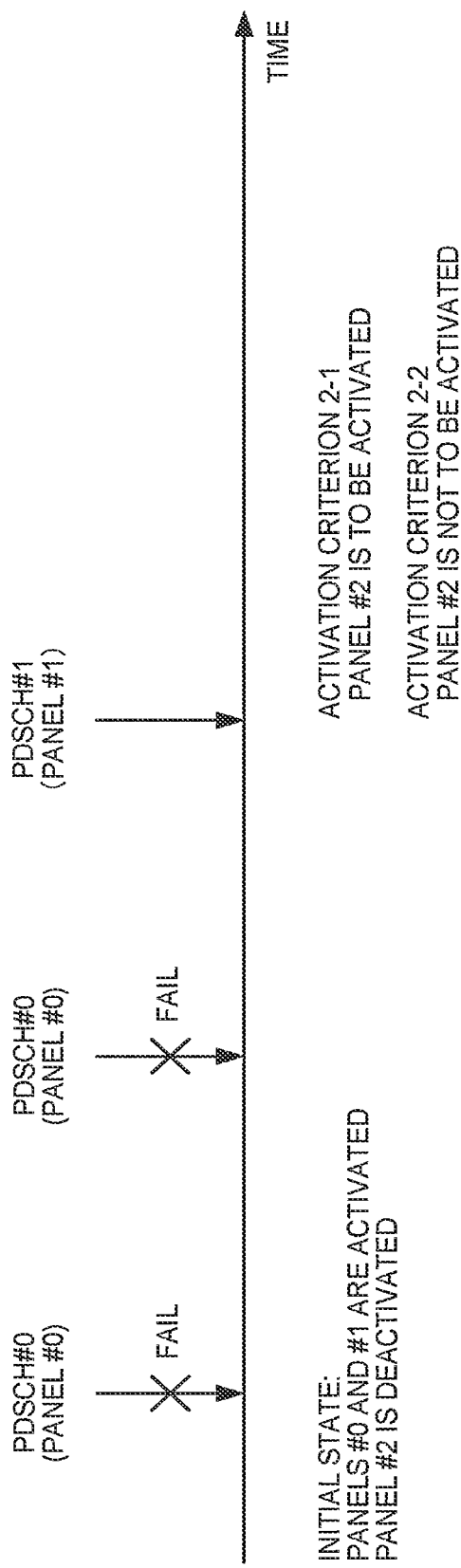
FIG. 9 is a diagram no show an example of a determination method of a panel to be activated.

In the example of FIG. 9, panels #0 and #1 are activated, and panel #2 is deactivated. The UE fails in receiving PDSCH #0 using panel #0, fails again in receiving PDSCH #0 using panel #0, and succeeds in receiving PDSCH #1 using panel #1.

When activation criterion 2-1 is used, N=1, and performance of the PDSCH of panel #0 is smaller than a threshold, the UE may determine to activate panel #2.

When activation criterion 2-2 is used, performance of the PDSCH of panel #0 does not satisfy a requirement, and performance of the PDSCH of panel #1 satisfies a requirement, the UE may determine not to activate panel #2.

Supposition 2-2

The UE receives the PDCCH/PDSCH using the deactivated panel. When performance of the panel is satisfactory (activation criterion 2-3), or when performance of the panel is more satisfactory than performance of the currently activated panel (activation criterion 2-4), or when performance of the currently activated panel is low (activation criteria 2-5 and 2-6), the UE determines to activate the panel.

Activation Criterion 2-3

When performance of the PDCCH/PDSCH of the panel is larger than a threshold in certain time duration, the panel may be activated Activation Criterion 2-4

When performance of the PDCCH/PDSCH of the panel is larger than that of one, N, or all of the activated panels in certain time duration, the panel may be activated.

Activation Criterion 2-5

If, regarding one, N, or all of the activated panels, performance of the PDCCH/PDSCH of the panels is lower than a threshold in certain time duration, a certain and (certain deactivated panel) may be activated. When performance of the deactivated panel is larger than a threshold, the panel having the highest performance among the deactivated panels may be activated. Alternatively, the panel having the highest measurement results (RSRP/SINR) of the best beam among the deactivated panels may be activated. Alternatively, the panel having the highest average measurement results (RSRP/SINR) of X beams among the deactivated panels may be activated.

Activation Criterion 2-6

When performance of the PDCCH/PDSCH of the activated panel does not satisfy a requirement in certain time duration, a certain panel (certain deactivated panel) may be activated. When performance of the deactivated panel is larger than a threshold, the panel having the highest performance among the deactivated panels may be activated. Alternatively, the panel having the highest measurement results (RSRP/SINR) of the best beam among the deactivated panels may be activated. Alternatively, the panel having the highest average measurement results (RSRP/SINR) of X beams among the deactivated panels may be activated.

At least one of the time duration, the threshold, X, and N may be defined in a specification, may be notified from the base station to the UE by using higher layer signaling or the like, or may be autonomously determined by the UE (UE implementation). Activation criteria 2-3 to 2-6 may be applied under a certain condition. The certain condition may be a case in which DL reception (DL Rx) in the panel is UE implementation, and deactivation of the panel is applied only to the UL.

Third Aspect

A third aspect will describe a case in which the UE reports (or requests) activation/deactivation of the panel to the base station, and performs activation/deactivation of the panel after confirmation/approval of the base station.

When the UE determines activation/deactivation of the panel based on a certain condition certain criterion, the UE reports a request for activation/deactivation of the panel to the base station. The base station may transmit, to the UE, approval information for the report from the UE. The approval information may be information indicating trigger of activation/deactivation of the panel.

The base station may notify the UE of the approval information using at least one of the MAC CE and the DCI. The approval information may be explicitly notified using a specific bit field, or may be implicitly notified using a transmission condition (for example, a transmission parameter such as a CCE index corresponding to DCI, or a position of a CORESET).

Figure 10A:
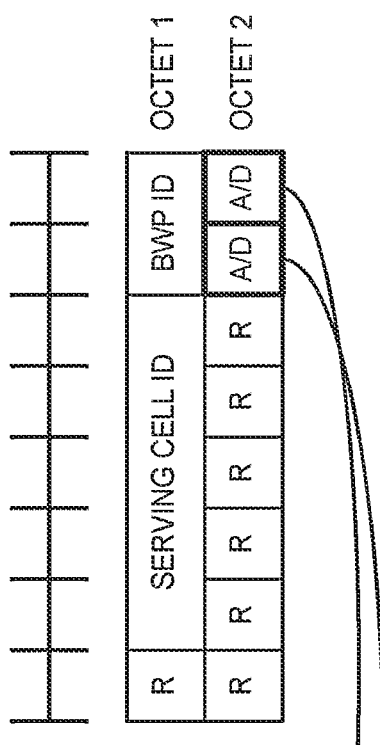
FIG. 10A to FIG. 10C are each a diagram to show an example of report contents of A/D of panels in a MAC CE transmitted by the UE and indication contents or A/D or panels in a MAC CE transmitted by the base station.
Figure 10B:
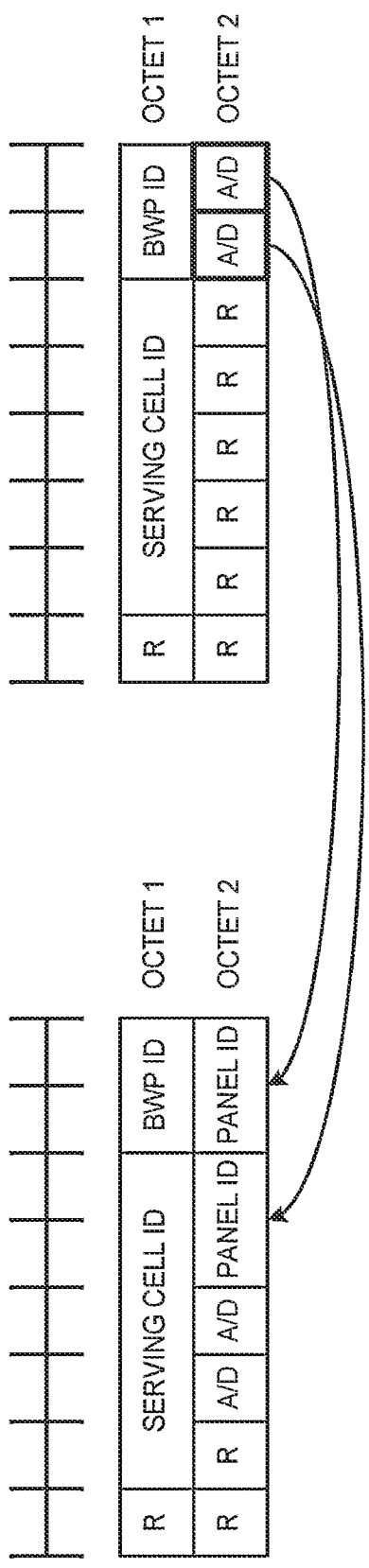
Figure 10C:
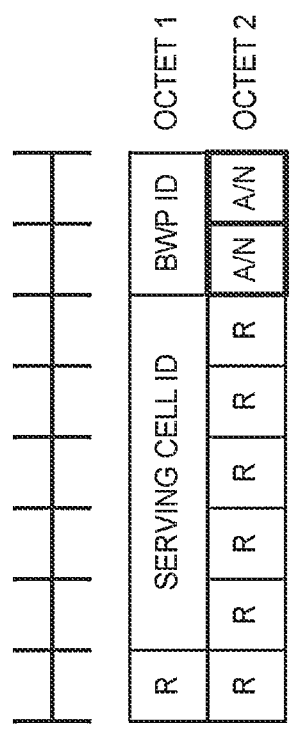

When the UE requests activation/deactivation for a specific panel (see FIG. 10A), the base station may transmit the approval information for activation/deactivation for the specific panel reported from the UE (see FIGS. 10B and 10C). When there is a request for activation/deactivation for a plurality of panels from the UE, the base station may transmit the approval information for each panel, or may transmit common approval information to the plurality of panels.

The base station may directly notify the UE of the panels for which activation/deactivation is indicated (or triggered/granted) (see FIG. 10B). FIG. 10B shows a case in which the UE requests activation/deactivation of specific panel IDs (here, panel IDs #1 and #2) using the MAC CE (see FIG. 10A), and the base station indicates activation/deactivation for each of panel ID #1, ID #2 using the MAC CE.

Alternatively, when the base station receives a request (or a report) for activation/deactivation of the panels from the UE, the base station may notify the USE of information indicating whether or not the base station recognizes the request (acknowledged or not). When the base station recognizes the request from the UE, the base station may transmit information about the recognition (for example, A/N) to the UE by including the information in the MAC CE (see FIG. 10C). A case is herein shown in which the UE requests activation/deactivation of specific panel IDs (here, panel IDs #1 and #2) by using the MAC CE, and the base station indicates A/N for each of panel IDs #1 and #2 by using the MAC CE.

When the UE receives the approval information (for example, ACK) from the base station, the UE may control to perform activation/deactivation for the reported panels. Otherwise (for example, in a case of receiving NACK), the UE may perform control not to perform activation/deactivation for the reported panels.

When the UE receives the approval information from the base station, the UE may control to perform activation/deactivation of the panel after certain timing. When the UE does not receive the approval information from the base station, whether or not the UE performs retransmission of the report or whether or not reselection of the panels to be activated/deactivated is performed may be autonomously determined by the UE, or may be determined based on a certain condition. UE operation when the UE does not receive the approval information from the base station may be defined in a specification, or may be configured for the UE by using higher layer signaling.

In this manner, by the base station giving a notification of the approval information for each panel, A/D can be flexibly controlled for each panel.

Moreover, when A/D of a plurality of panels is requested from the UE, the base station may transmit common approval information (A/D notification, or A/N notification) to the plurality of panels. In this case, increase of overhead of the approval information can be suppressed.

Radio Communication System

Hereinafter, a structure of a radio communication system according to one embodiment of the present disclosure will be described. In this radio communication system, the radio communication method according to each embodiment of the present disclosure described above may be used alone or may be used in combination for communication.

Figure 11:
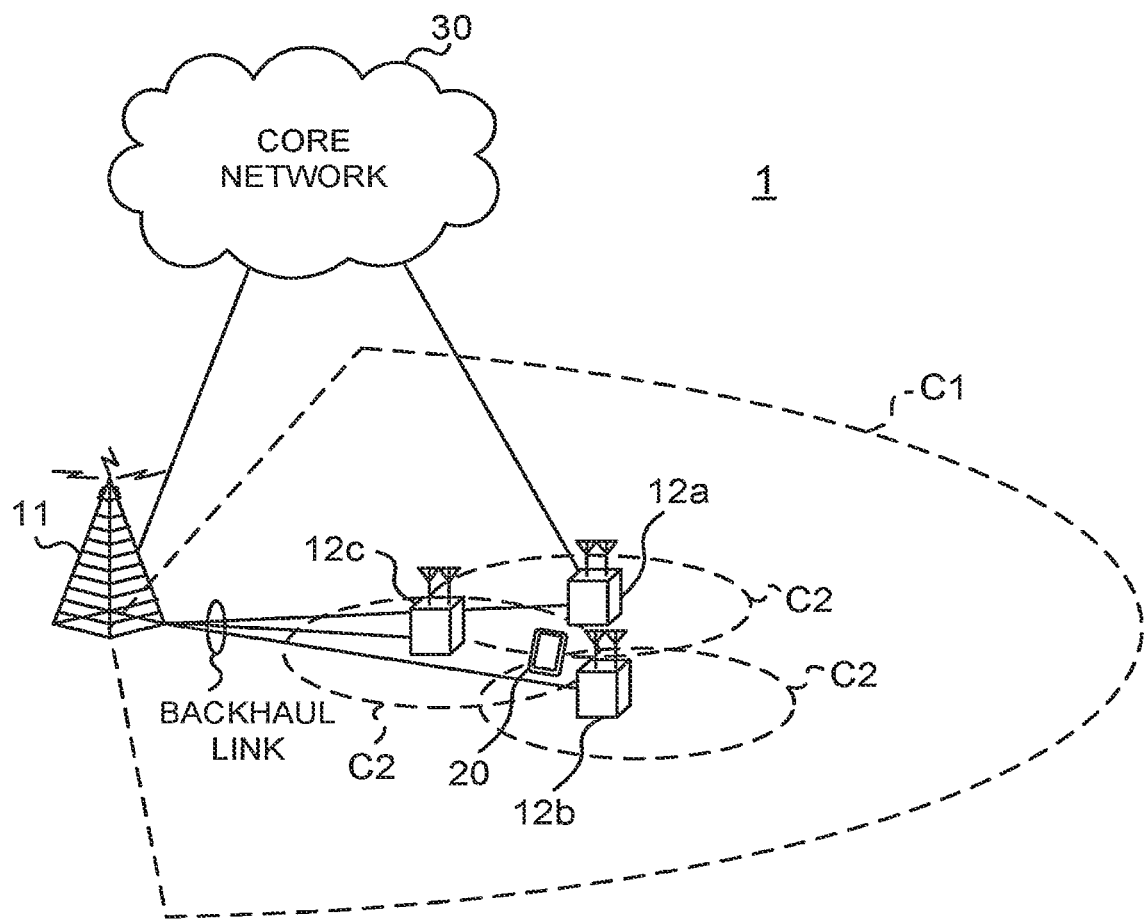
FIG. 11 is a diagram to show an example of a schematic structure of a radio communication system according to one embodiment.

FIG. 11 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eND) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UE and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBS) and so on are communicated on the PDSCH. User data, higher layer control information and so on may be communicated on the PUSCH. The Master information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

Base Station

Figure 12:
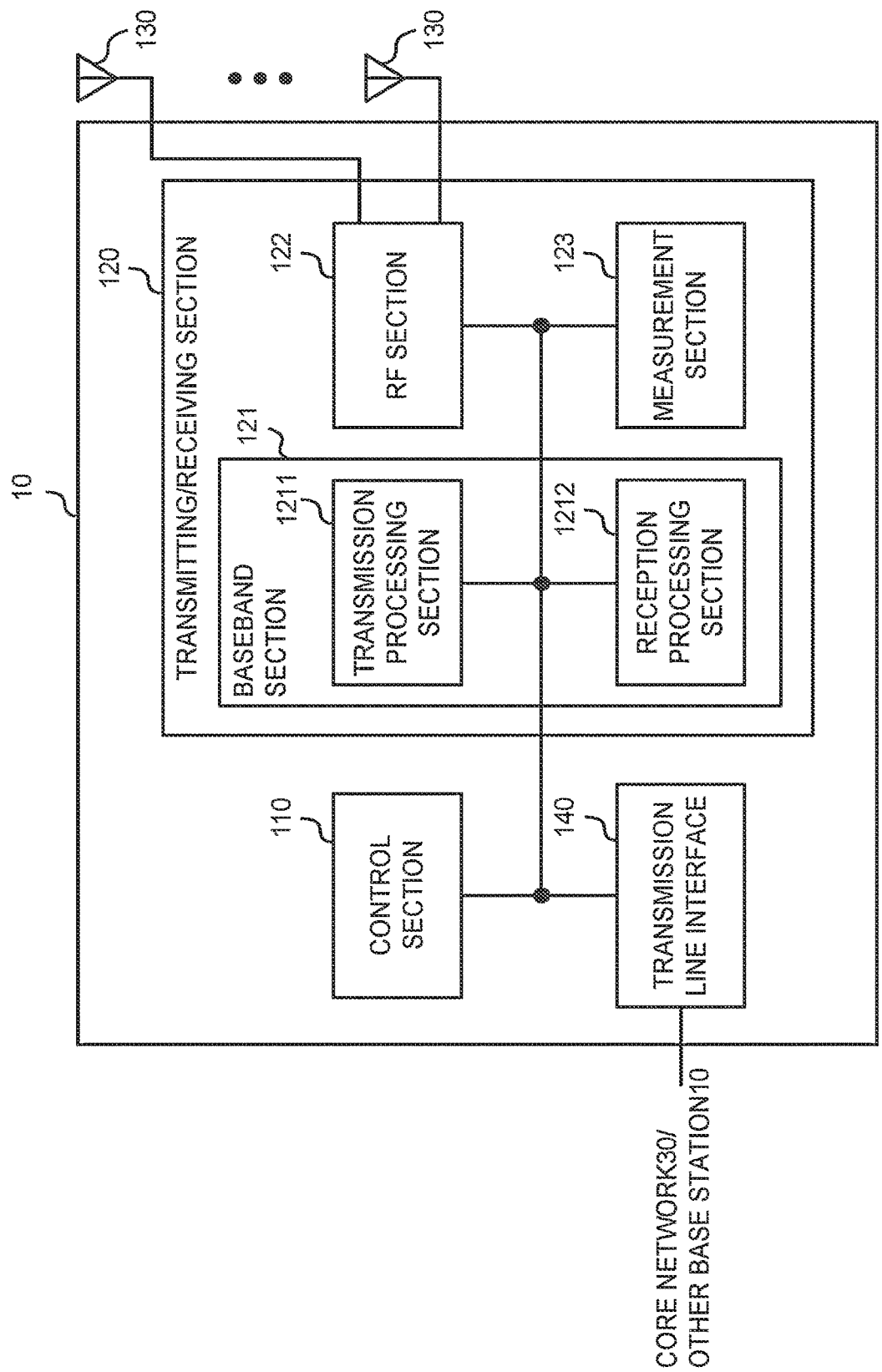
FIG. 12 is a diagram to show an example of a structure of a base station according to one embodiment.

FIG. 12 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding, (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RPM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit information for requesting a report related to activation or deactivation for a panel. The transmitting/receiving section 120 may receive the report related to activation or deactivation for the panel.

The transmitting/receiving section 120 may receive a report indicating a request for activation or deactivation of a panel. The transmitting/receiving section 120 may transmit information indicating activation or deactivation of the panel, based on the report.

The control section 110 may control transmission/reception in the transmitting/receiving section 120.

User Terminal

Figure 13:
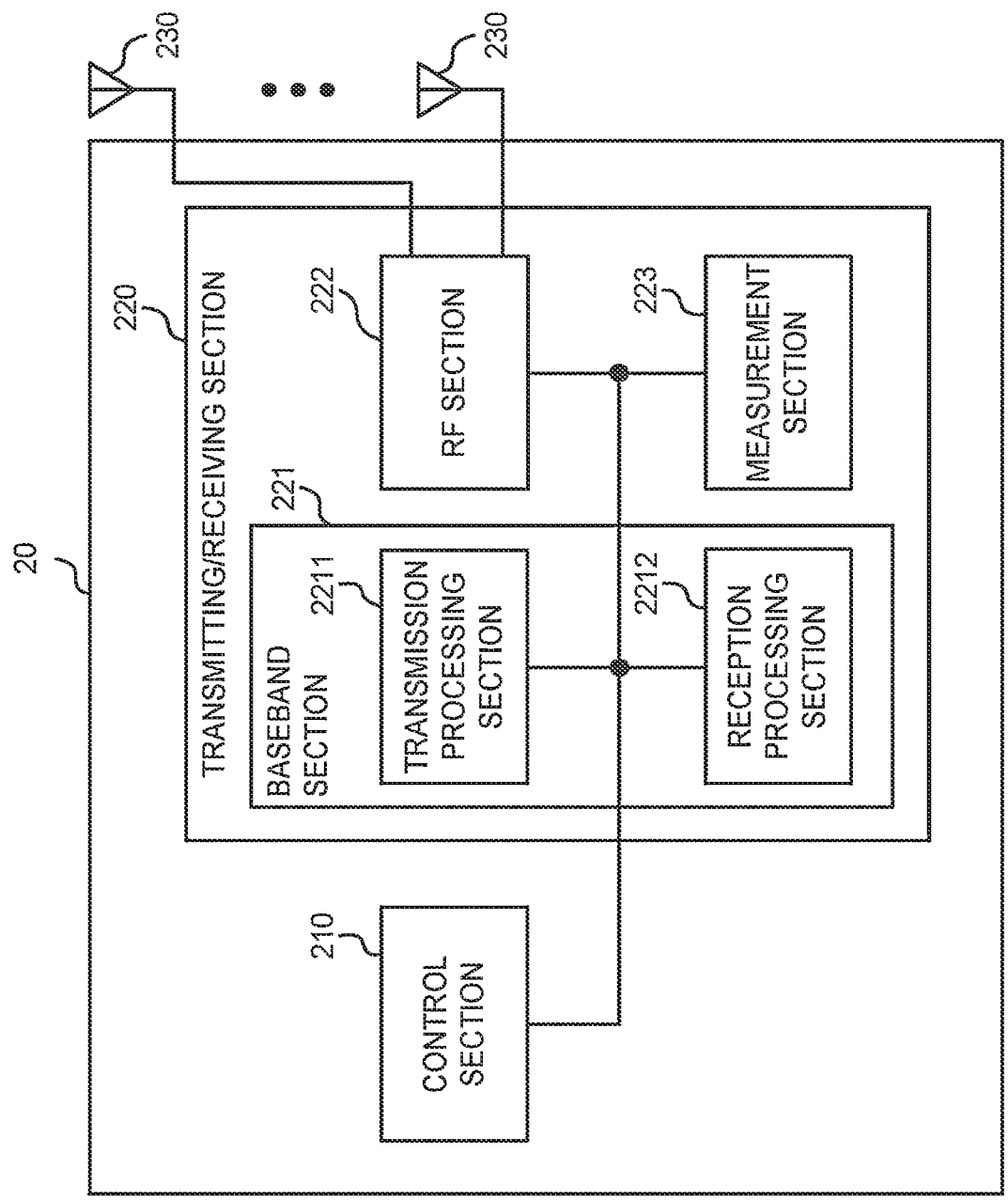
FIG. 13 is a diagram to show an example of a structure of a user terminal according to one embodiment.

FIG. 13 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the PLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RPM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may transmit a report related to activation or deactivation for a panel by including the report in at least one of channel state information and MAC control information (MAC CE).

The transmitting/receiving section 220 may transmit a report indicating activation or deactivation of a panel, or a report indicating a request for activation or deactivation of the panel.

The control section 210 may determine activation or deactivation for a panel. The control section 210 may control transmission timing of the report related to activation or deactivation for the panel, based on a notification from a base station. The control section 210 may control transmission timing of the report related to activation or deactivation for the panel, based on a specific condition. The control section 210 may control to perform a report related to activation or deactivation for a plurality of panels in a single report.

The control section 210 may determine activation or deactivation of the panel, based on measurement results of a reference signal (for example, a CSI-RS/SSB) or performance of a downlink channel. The control section 210 may determine a panel to be newly activated, based on measurement results of a reference signal for the panel in an activate state or performance of a downlink channel. The control section 210 may determine a panel to be newly activated, based on measurement results of a reference signal for the panel in a deactivate state or performance of a downlink channel. The control section 210 may control to perform activation or deactivation of the panel, based on information notified from the base station after the report indicating the request for activation or deactivation of the panel.

Hardware Structure

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 14:
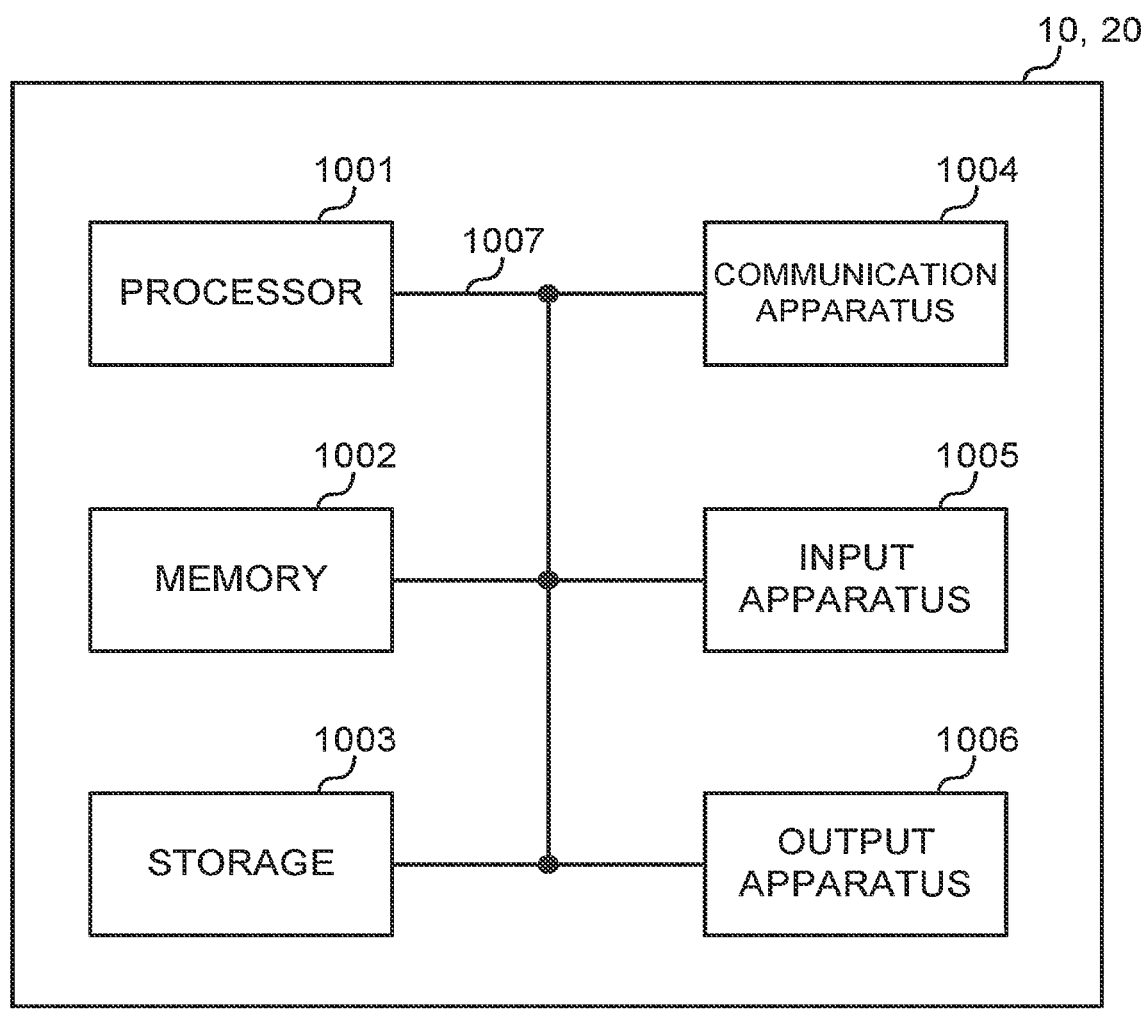
FIG. 14 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 14 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot,"a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive sub carriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB, may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety or different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the test=such as "precoding," "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the test=such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pica cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)" "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal,"

"wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (ERA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) applied.

The phrase "based on" (or "on the basis of") as used in the present disclosure does not mean "based only on" (or "only on the basis of") unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or mar mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a processor that determines activation or deactivation for a Reference Signal (RS) group; and
a transmitter that transmits a first report related to a determination, by the processor, of activation or deactivation for the RS group by including the first report in Medium Access Control control information (MAC CE),
wherein the processor performs a second report related to activation or deactivation for a plurality of RS groups in a single report, and
wherein the processor controls transmission of the second report, based on an expiry of a timer or received power of a RS.

2. A radio communication method for a terminal, comprising:
determining activation or deactivation for a Reference Signal (RS) group, and
transmitting a first report related to determined activation or deactivation for the RS group by including the first report in Medium Access Control control information (MAC CE),
wherein a second report related to activation or deactivation for a plurality of RS groups performs in a single report, and
wherein transmission of the second report is controlled based on an expiry of a timer or received power of a RS.

3. A base station comprising:
a transmitter that transmits information for indicating activation or deactivation for a Reference Signal (RS) group; and
a receiver that receives a first report related to determined activation or deactivation for the RS group by including the first report in Medium Access Control control information (MAC CE),
wherein a second report related to activation or deactivation for a plurality of RS groups is performed in a single report in the MAC CE, and
wherein the second report is transmitted based on an expiry of a timer or received power of a RS.

4. A system comprising a terminal and a base station, wherein the terminal comprises:
a processor that determines activation or deactivation for a Reference Signal (RS) group; and
a transmitter that transmits a first report related to a determination, by the processor, of activation or deactivation for the RS group by including the first report in Medium Access Control control information (MAC CE),
wherein the processor performs a second report related to activation or deactivation for a plurality of RS groups in a single report, and
wherein the processor controls transmission of the second report, based on an expiry of a timer or received power of a RS; and
the base station comprises:
a receiver that receives the MAC CE.

* * * * *